United States Patent
Sato et al.

(10) Patent No.: US 7,949,431 B2
(45) Date of Patent: May 24, 2011

(54) FITTING DEVICE FOR ADJUSTING STATE OF CLOGGING CAUSED IN FIT

(75) Inventors: Takashi Sato, Yamanashi (JP); Nobuaki Yamaoka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 115 days.

(21) Appl. No.: 12/510,662

(22) Filed: Jul. 28, 2009

(65) Prior Publication Data

US 2010/0057256 A1 Mar. 4, 2010

(30) Foreign Application Priority Data

Sep. 3, 2008 (JP) ................................. 2008-225854

(51) Int. Cl.
*G05B 15/00* (2006.01)
(52) U.S. Cl. .......... 700/258; 700/90; 700/245; 700/250; 700/253; 700/255
(58) Field of Classification Search .................... 700/90, 700/245, 250, 253, 255, 258
See application file for complete search history.

(56) References Cited

U.S. PATENT DOCUMENTS

| | | | | |
|---|---|---|---|---|
| 5,207,554 A | * | 5/1993 | Asakawa et al. | 414/744.6 |
| 5,619,782 A | * | 4/1997 | Tanaka et al. | 29/407.1 |
| 6,553,652 B2 | * | 4/2003 | Sakakibara et al. | 29/709 |
| 2002/0056181 A1 | * | 5/2002 | Sakakibara et al. | 29/407.01 |
| 2008/0188985 A1 | * | 8/2008 | Sakano | 700/260 |
| 2008/0267737 A1 | * | 10/2008 | Hatanaka et al. | 414/1 |
| 2008/0312769 A1 | * | 12/2008 | Sato et al. | 700/249 |

FOREIGN PATENT DOCUMENTS

| | | |
|---|---|---|
| JP | 60003010 A | 1/1985 |
| JP | 62-145305 A | 6/1987 |
| JP | 04-025325 A | 1/1992 |
| JP | 04-348887 A | 12/1992 |
| JP | 2005-028532 A | 2/2005 |

OTHER PUBLICATIONS

Notice of Reasons for Rejection from JPO regarding Japanese Patent Application No. 2008-225854, dated Jun. 15, 2010.

* cited by examiner

*Primary Examiner* — Khoi Tran
*Assistant Examiner* — Jonathan L Sample
(74) *Attorney, Agent, or Firm* — Lowe Hauptman Ham & Berner LLP

(57) ABSTRACT

A fitting device for fitting a fitting workpiece, which is held by a robot, to a workpiece to be fitted by force control, comprises: a force detecting portion for detecting a force and moment acting on a control point of the fitting workpiece; a judging portion for judging whether or not clogging is caused between the fitting workpiece and the workpiece to be fitted at the time of fitting; and a changing portion for changing a position of the control point according to a distance by which the fitting workpiece enters the workpiece to be fitted and for pressing the fitting workpiece against the workpiece to be fitted in a direction perpendicular to the fitting direction so as to adjust a posture of the fitting workpiece on the basis of the control point that has been changed, in the case where it is judged by the judging portion that clogging is caused. Due to the foregoing, posture of the fitting workpiece can be appropriately adjusted in a short period of time so that the fitting workpiece can be fitted into the workpiece to be fitted.

5 Claims, 8 Drawing Sheets

FITTING DEVICE FOR ADJUSTING STATE OF CLOGGING CAUSED IN FIT

RELATED APPLICATIONS

The present application is based on, and claims priority from, Japanese Application Number 2008-225854, filed Sep. 8, 2008, the disclosure of which is hereby incorporated by reference herein in its entirety.

BACKGROUND OF THE INVENTION

1. Field of the Invention

The present invention relates to a fitting device for fitting a fitting to a workpiece, which is held by a robot, to a workpiece to be fitted by force control.

2. Description of the Related Art

It is conventional to execute a fitting operation by using a controlling rule in which RCC (remote-center compliance) is imitated when a virtual compliance is composed. Japanese Examined Patent Publication No. 4-43744 discloses one method in which a rod-shaped fitting workpiece held by a robot hand is fitted into a fitting hole of a workpiece to be fitted.

According to the method disclosed in Japanese Examined Patent Publication No. 4-43744, a fitting workpiece is pressed against a workpiece to be fitted and a force and moment acting at the time are detected for each controlling period and control is effected so that the force and moment can be respectively a target value.

Further, Japanese Unexamined Patent Publication No. 4-25325 discloses a technique in which a disk hole is fitted to a spindle. According to Japanese Unexamined Patent Publication No. 4-25325, in the case where a position of the disk hole and that of the spindle greatly deviate from each other in a direction perpendicular to the fitting direction, in addition to the force given in the fitting direction, a force in the direction perpendicular to the fitting direction is generated so that a disk is moved in an oblique direction. Due to this operation, while a problem of the deviation between the two positions is being solved, the disk is fitted to the spindle.

In Japanese Examined Patent Publication No. 4-43744, consideration is given to a case in which a fitting workpiece is fitted to a workpiece to be fitted at two points. In this case, since forces acting at the two points contain components, the directions of which are opposite to each other, a resultant force of the forces acting at the two points is lower than the respective forces. Accordingly, the moment obtained from the resultant force also becomes lower. In the case where this moment is lower than the moment of disturbance caused by vibrations of a robot, it becomes difficult to change a posture of the fitting workpiece on the basis of this moment. Therefore, the time necessary for adjusting the posture of the fitting workpiece is greatly extended. Further, in the case where intensities of the forces acting at the two points are the same and directions are opposite to each other, the moment becomes zero. In this case, even when the long period of time is consumed, it is impossible to appropriately change the posture of the fitting workpiece.

Further, it is possible to consider that the technique disclosed in Japanese Unexamined Patent Publication No. 4-25325 is applied to a case in which a rod-shaped fitting workpiece is fitted into a fitting hole of a workpiece to be fitted. However, Japanese Unexamined Patent Publication No. 4-25325 does not disclose a technique in which a force different from the force in the fitting direction is generated in the direction such as a direction perpendicular to the fitting direction. Accordingly, there is a possibility that a force, the direction of which is not appropriate, is acted on the fitting workpiece and further there is a possibility that errors of the position and posture of the fitting workpiece are increased.

The present invention has been accomplished in light of the above circumstances. An object of the present invention is to provide a fitting device capable of appropriately adjusting a posture of a fitting workpiece in a short period of time in the case where clogging is caused between a fitting workpiece and a workpiece to be fitted.

SUMMARY OF THE INVENTION

In order to accomplish the above object, the first invention provides a fitting device for fitting a fitting workpiece, which is held by a robot, to a workpiece to be fitted by force control, comprising: a force detecting portion for detecting a force and moment acting on a control point of the fitting workpiece; a judging portion for judging whether or not clogging is caused between the fitting workpiece and the workpiece to be fitted at the time of fitting; and a changing portion for changing a position of the control point according to a distance by which the fitting workpiece enters the workpiece to be fitted and for pressing the fitting workpiece against the workpiece to be fitted in a direction perpendicular to the fitting direction so as to adjust a posture of the fitting workpiece on the basis of the control point that has been changed, in the case where it is judged by the judging portion that clogging is caused.

According to the second invention, in the first invention, the judging means judges according to the force and moment detected by the force detecting portion whether or not clogging is caused.

According to the third invention, the fitting device according to the first invention further comprises a position detecting means for detecting a position of the fitting workpiece for each predetermined period, and the judging means judges according to a change in the time in the fitting direction of the fitting workpiece detected by the position detecting means whether or not clogging is caused.

According to the fourth invention, in one of the first to the third invention, the changing means presses the fitting workpiece in at least one direction perpendicular to the fitting direction in the case where the judging means judges that clogging is caused.

According to the fifth invention, in one of the first to the third invention, the changing means executes a pressing action in order in a direction perpendicular to the fitting direction of the fitting workpiece in a circumferential direction of the fitting workpiece in the case where the judging means judges that clogging is caused.

These and other objects, features and advantages of the present invention will be more apparent in light of the detailed description of exemplary embodiments thereof as illustrated by the drawings.

DETAILED DESCRIPTION

Referring to the accompanying drawings, an embodiment of the present invention will be explained below. In the following drawings, like reference marks are used to indicate like parts. In order to facilitate the understanding, the reduced scale used in these drawings is appropriately changed.

Figure 1:
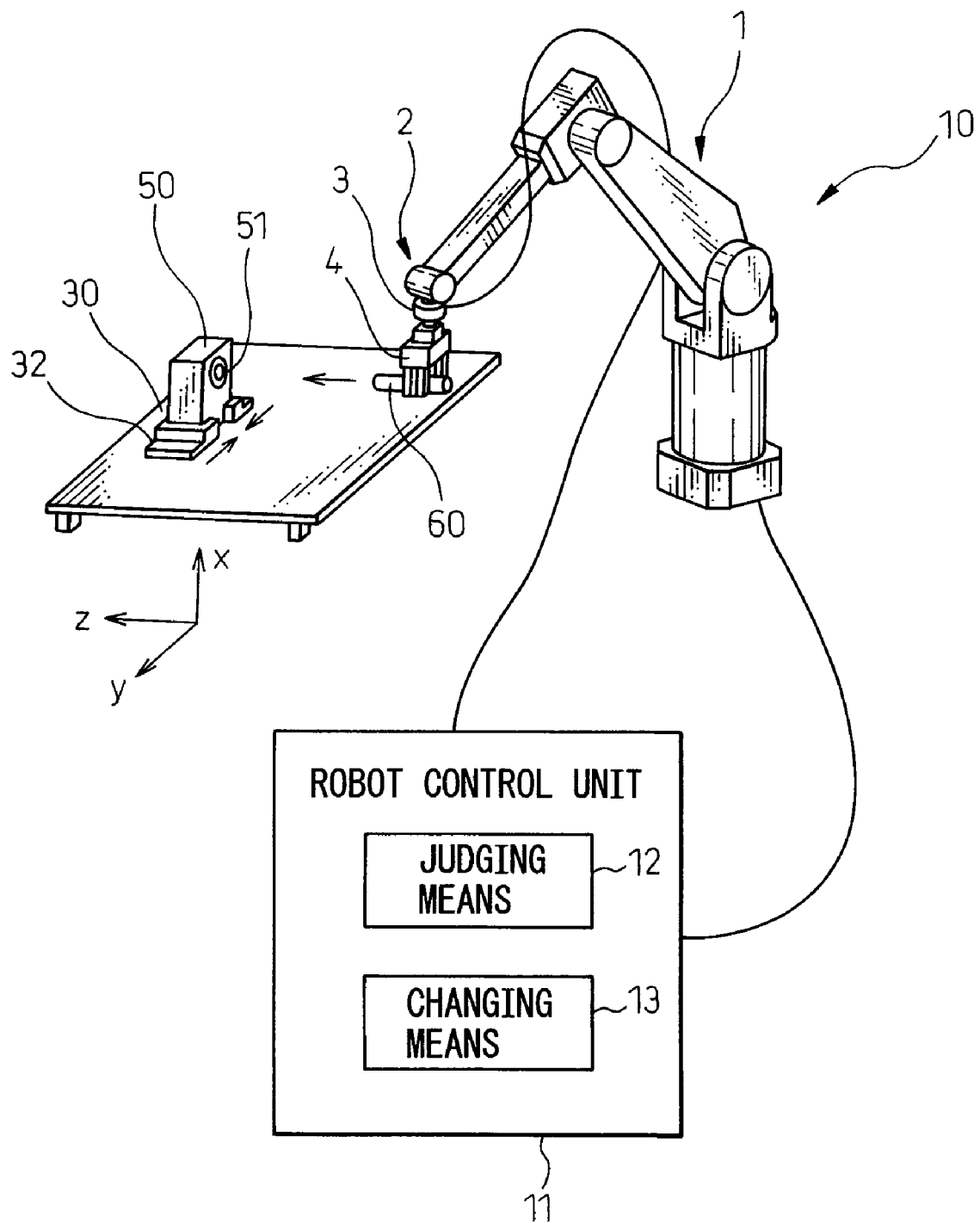
FIG. 1 is a schematic illustration showing a fitting device according to the present invention.

FIG. 1 is a schematic illustration showing a fitting device according to the present invention. The fitting device 10 shown in FIG. 1 includes: a robot 1; and a robot control unit 11. The robot 1 is a vertical articulated robot of 6-axis type. The hand 4 is attached to a forward end portion of the robot arm 2 of the robot 1. As shown in the drawing, a force sensor 3 is arranged between the robot arm 2 and the hand 4. The force sensor 3 detects a force and/or moment acting on the control point P (described later) of the fitting workpiece 60.

The robot 1 and the force sensor 3 are connected to the robot control unit 11. The robot control unit 11 is a digital computer and controls an action of the entire robot 1 of the fitting device 10. The robot control unit 11 includes a judging means 12 for judging whether or not clogging is caused between the fitting workpiece 60 described later and the workpiece 50 to be fitted.

The robot control unit 11 further includes a changing means 13. In the case where it is judged by the judging means 12 that clogging is caused, the changing means 13 changes a position of the control point of the fitting workpiece 60 in accordance with a distance by which the fitting workpiece 60 enters the workpiece 50 to be fitted, so that the fitting workpiece 60 can be pressed against the workpiece 50 to be fitted in a direction perpendicular to the fitting direction.

Although not shown in the drawing, the robot control unit 11 includes a position control means for carrying out a position command, which has been made by a predetermined method, to the robot 1. The robot control unit 11 further includes a force control portion for carrying out a force command with respect to the robot 1 according to the force detection value detected by the force sensor 3 and also according to the position command or the force command which has been made by a predetermined method.

In FIG. 1, the columnar type fitting workpiece 60 is held by the hand 4 of the robot 1. The workpiece 50 to be fitted having a fitting hole 51 capable of being fitted to the fitting workpiece 60 is arranged facing the fitting workpiece 60. In FIG. 1, the workpiece 50 to be fitted is fixed at a predetermined position on the supporting table 30 by holding fixtures 32. In this connection, as shown in the drawing, Z-axis is arranged in the central direction (the fitting direction) of the fitting hole 51 of the workpiece 50 to be fitted. X-axis and Y-axis are arranged on the faces perpendicular to this Z-axis.

Figure 2:
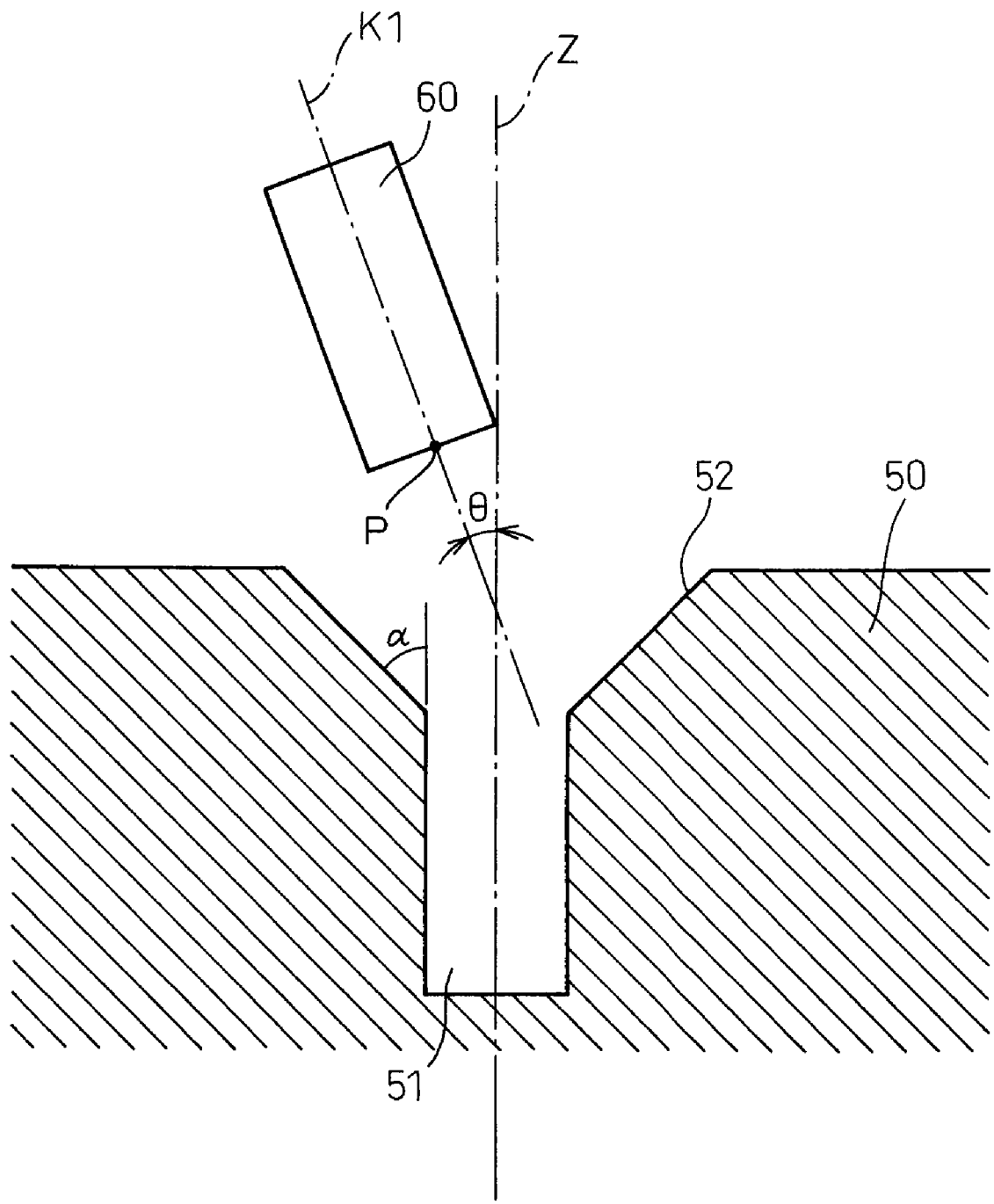
FIG. 2 is an enlarged sectional view showing a fitting workpiece and a workpiece to be fitted.

FIG. 2 is an enlarged sectional view showing a fitting workpiece and a workpiece to be fitted. As shown in the drawing, at an end portion of the fitting hole 51 formed in the workpiece 50 to be fitted, the chamfer portion 52 is formed. In the embodiment shown in FIG. 2, the angle α of the chamfer portion 52 is 45°. However, the angle α is not limited to 45°, that is, the angle α may be different from 45°. A center on the bottom face of the fitting workpiece 60 is set as the control point P. At this control point P, a force and moment acting on the fitting workpiece 60 are calculated. This control point P is a reference point used at the time of adjusting the position/posture of the fitting workpiece 60 when control is executed according to the present invention.

Explanations will be made into the fitting operation of the fitting device 10 according to the present invention. First, the hand 4 of the robot 1 holds the fitting workpiece 60 being controlled by the position control portion. Then, the thus held fitting workpiece 60 is moved to a position right before the fitting hole 51 of the workpiece 50 to be fitted. After that, control is changed over from the position control, which is executed by the position control portion, to the force control executed by the force control portion. The following explanations are made in the case in which control is executed under the condition of force control.

Figure 3:
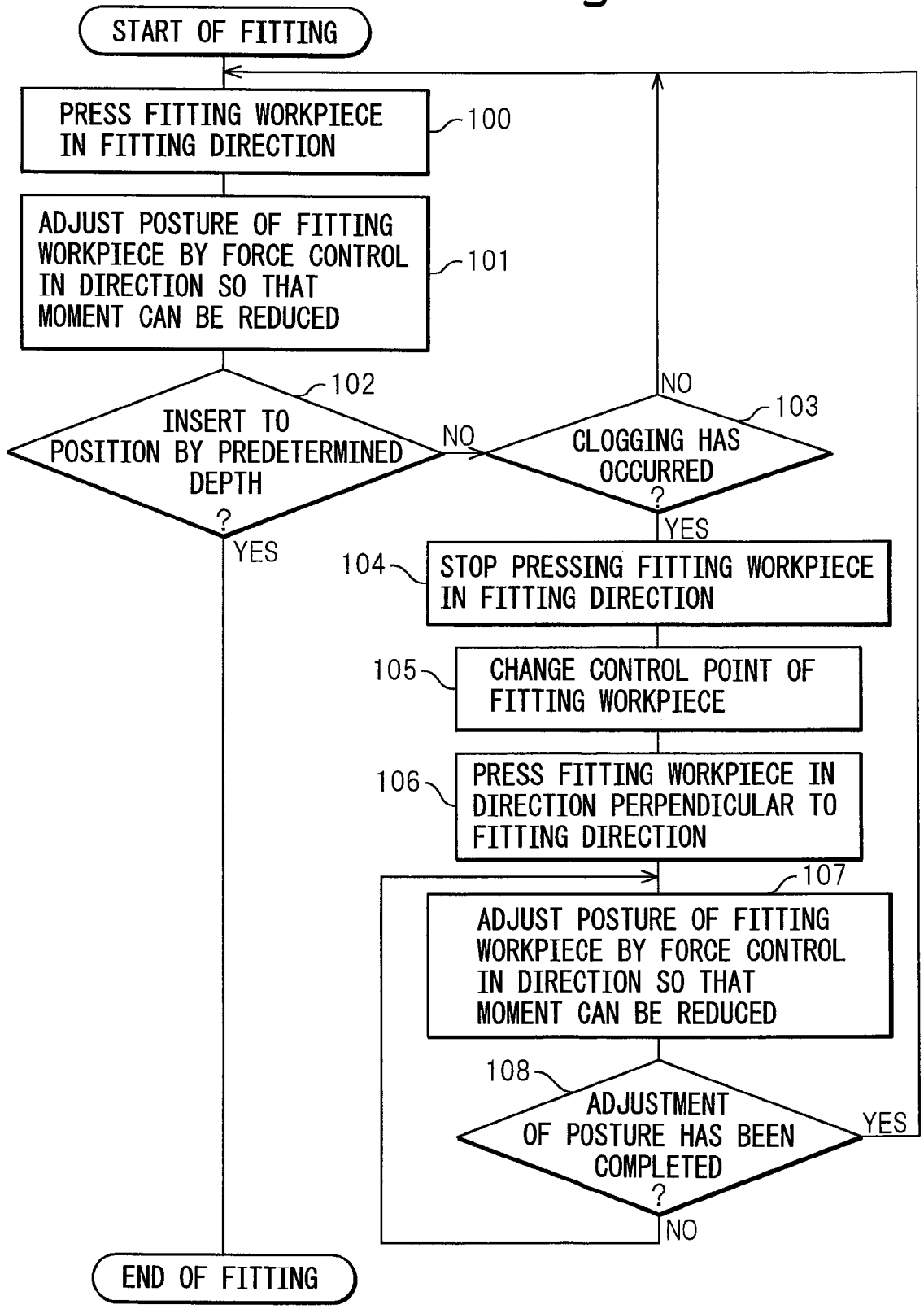
FIG. 3 is a flow chart showing actions of the fitting device according to the present invention.

FIG. 3 is a flow chart showing actions of the fitting device. In step 100 shown in FIG. 3, the fitting workpiece 60 is pressed in the fitting direction, that is, in the direction Z. In step 101, calculations shown by the following expressions (1) to (5) are made for each control period, so that the fitting workpiece 60 can be controlled.

$$v^D_X = F_X \times G_X \tag{1}$$

$$v^D_Y = F_Y \times G_Y \tag{2}$$

$$v^D_Z = (F_Z - F_d) \times G_Z + v_d \tag{3}$$

$$\omega^D_X = M_X \times G_W \tag{4}$$

$$\omega^D_Y = M_Y \times G_P \tag{5}$$

In the above expressions (1) to (5), $v^D_X$, $v^D_Y$, $v^D_Z$, $\omega^D_X$, $\omega^D_Y$ and $\omega^D_Z$ are speed command values in the directions X, Y, Z and angular speed command values around the above directions. $F_x$, $F_y$, $F_z$, $M_x$ and $M_y$ are forces in the respective directions and detection values of moment. Further, $G_x$, $G_y$, $G_z$, $G_w$ and $G_p$ are force control gains in the respective directions. $F_d$ is a target force and $v_d$ is a target speed.

Figure 4A:
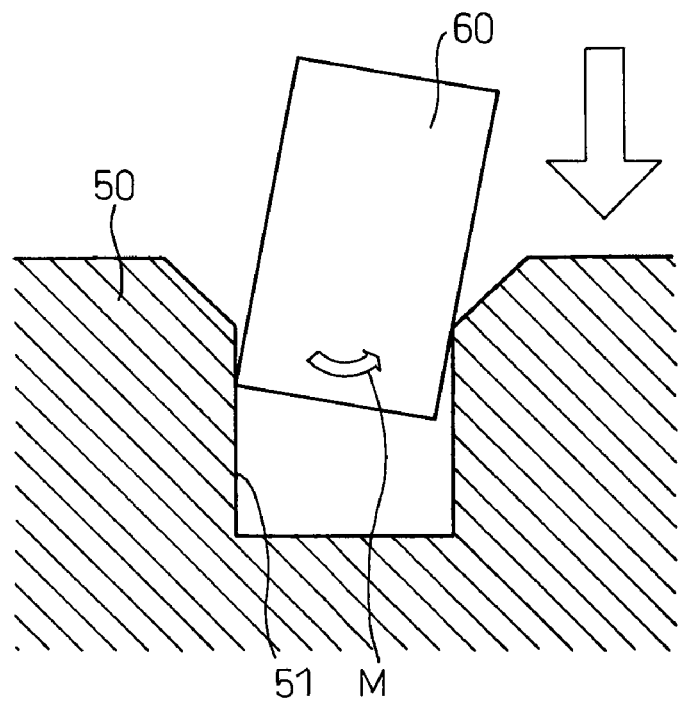
FIG. 4a is an enlarged sectional view showing a fitting workpiece and a workpiece to be fitted at the time of pressing the fitting workpiece against the workpiece to be fitted in the fitting direction.
Figure 4B:
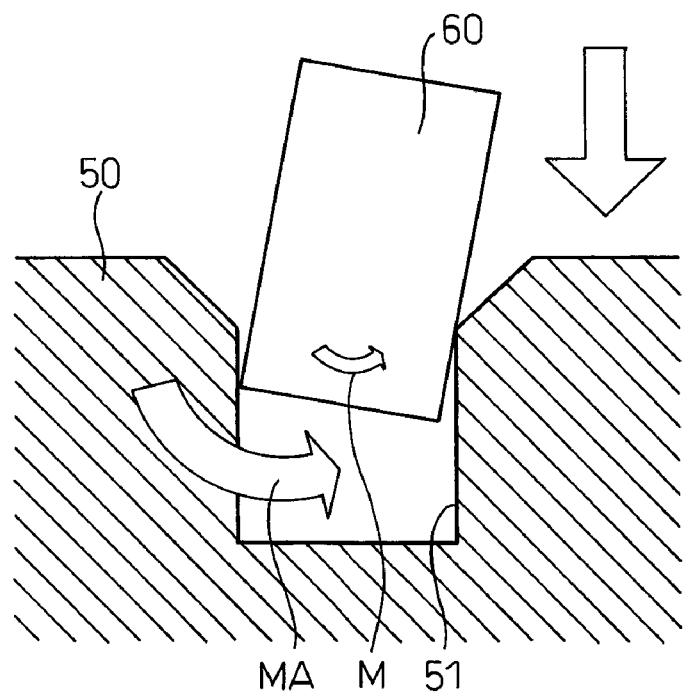
FIG. 4b is another enlarged sectional view showing a fitting workpiece and a workpiece to be fitted at the time of pressing the fitting workpiece against the workpiece to be fitted in the fitting direction.

FIGS. 4a and 4b are enlarged sectional views showing a fitting workpiece and a workpiece to be fitted at the time of pressing the fitting workpiece against the workpiece to be fitted in the fitting direction. When the fitting workpiece 60 is pressed against the workpiece 50 to be fitted in the fitting direction, a portion of the fitting workpiece 60 comes into contact with the workpiece 50 to be fitted and then the moment M is generated as shown in FIG. 4a. By this moment M, an error of the position/posture of the fitting workpiece 60 is adjusted in the direction shown by the arrow MA. This adjustment is a method of the prior art. When the fitting workpiece 60 is pressed against the workpiece 50 to be fitted in the fitting direction, this adjustment is executed.

In step 102, it is judged whether or not the fitting workpiece 60 has entered the fitting hole 51 by a predetermined depth. Whether or not the fitting workpiece 60 has entered the fitting hole 51 by a predetermined depth can be judged by an encoder (not shown) attached to a servo motor to drive the arm of the robot 1. In the case where the fitting workpiece 60 has entered the fitting hole 51 by the predetermined depth, it is judged that the fitting operation has been completed and the processing is finished.

On the contrary, in the case where the fitting workpiece 60 has not entered the fitting hole 51 by the predetermined depth, the program proceeds to step 103 and the judging means 12 of the robot control unit 11 judges whether or not the fitting workpiece 60 has clogged in the workpiece 50 to be fitted. The judging means 12 judges the occurrence of clogging of the fitting workpiece 60 by the following expressions (6) to (10).

$$|F_X| \leq T_F \quad (6)$$

$$|F_Y| \leq T_F \quad (7)$$

$$|F_Z - F_d| \leq T_F \quad (8)$$

$$|M_X| \leq T_M \quad (9)$$

$$|M_Y| \leq T_M \quad (10)$$

In this connection, $T_F$ and $T_M$ are respectively threshold values for judging that the force and moment come close to the target values. In the case where it is difficult to judge the occurrence of clogging because of disturbance caused by vibrations and others of the robot, data of the detected force and moment may be subjected to filtering.

Further, clogging of the fitting workpiece 60 may be judged according to the following expressions (11) to (15).

$$|v_X| \leq T_v \quad (11)$$

$$|v_Y| \leq T_v \quad (12)$$

$$|v_Z| \leq T_v \quad (13)$$

$$|\omega_X| \leq T_\omega \quad (14)$$

$$|\omega_Y| \leq T_\omega \quad (15)$$

In this case, $v_X$, $v_Y$, $v_Z$, $\omega_X$, $\omega_Y$ are the actual speeds and angular speeds in the respective directions calculated from the position of the actuator attached to the robot arm. $T_v$ and $T_\omega$ are respectively threshold values of the speed and the angular speed for judging the occurrence of clogging. In the case where it is difficult to make an accurate judgment because of the influence of disturbance, the actual speed and the angular speed may be subjected to filtering. Further, when a position of the fitting workpiece 60 is detected for each control period by the encoder and a change in the time in the fitting direction of the position of the fitting workpiece 60 is smaller than a predetermined value, it may be judge that clogging has been caused.

In the case where it is judged in step 103 that clogging has occurred, the program proceeds to step 104 and pressing of the fitting workpiece 60 in the fitting direction is stopped. In this connection, in the case where it is judged that no clogging has occurred, the program returns to step 100 and processing is repeated.

Figure 5:
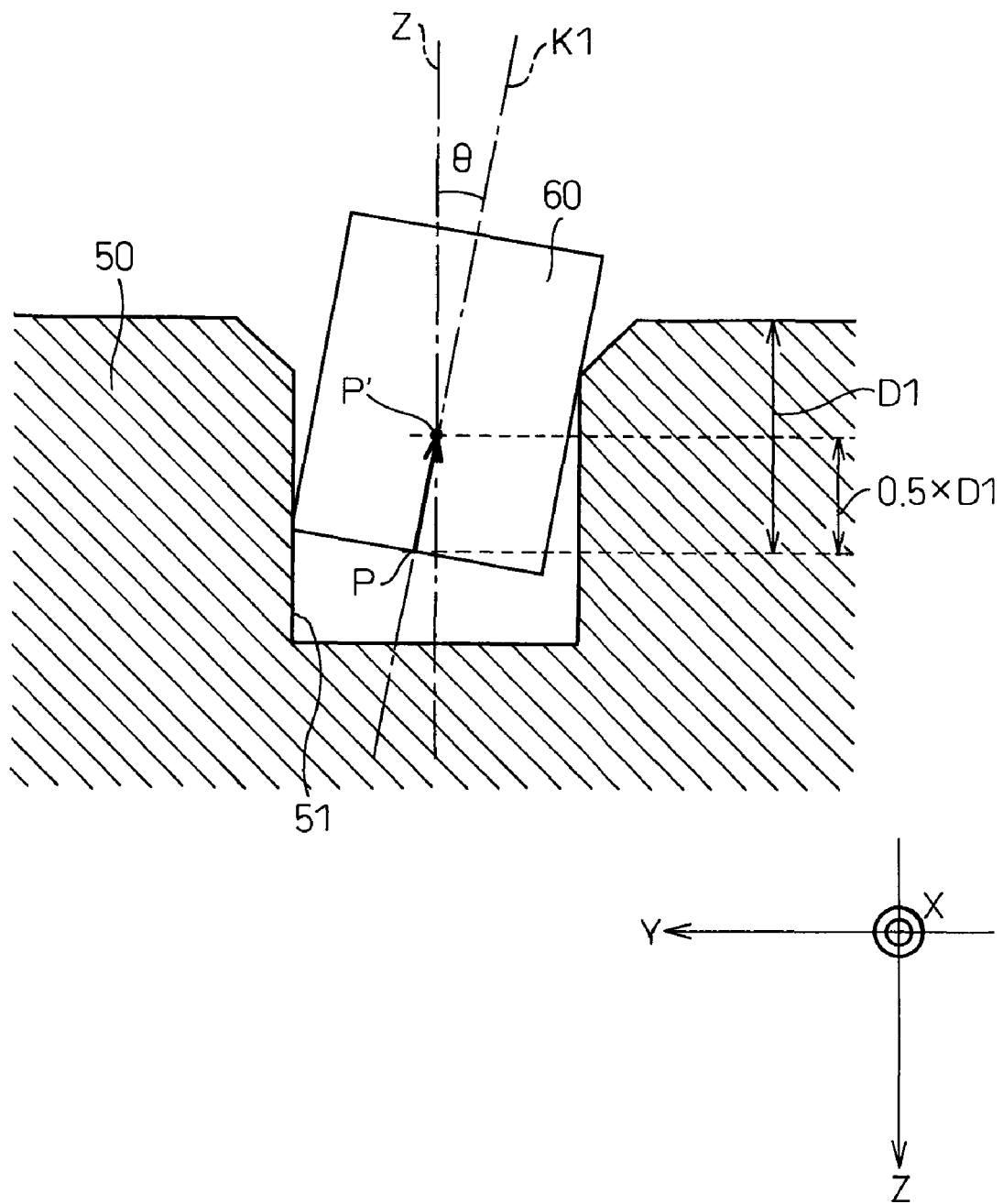
FIG. 5 is another enlarged sectional view showing a fitting workpiece and a workpiece to be fitted.

Then, in step 105 shown in FIG. 3, the changing means 13 of the robot control unit 11 changes a position of the control point P of the fitting workpiece 60. FIG. 5 is another enlarged sectional view showing a fitting workpiece and a workpiece to be fitted. In FIG. 5, while the center line K1 of the fitting workpiece 60 is forming an angle θ with respect to the fitting direction Z of the fitting hole 51, the fitting workpiece 60 clogs in the workpiece 50 to be fitted. In FIG. 5, the fitting workpiece 60 enters the fitting hole 51 by the distance D1.

By the changing means 13, a position of the control point P is moved upward from the center of the bottom face of the fitting workpiece 60 along the center line K1. A moving distance of the control point P is longer than zero and shorter than the entering distance D1. It is preferable that the moving distance of the control point P is a half of the entering distance D1. In this case, even when the fitting workpiece 60 is pressed against the workpiece 50 to be fitted in any direction perpendicular to the fitting direction, the moment of the substantially same intensity acts on the fitting workpiece 60 and the position/posture of the fitting workpiece 60 can be adjusted to a similar extent.

Strictly speaking, as can be seen from FIG. 5, the moving distance of the control point P in the center line K1 is 0.5× D1×cos θ. However, it is actual that θ≈0. Therefore, 0.5×D1 may be employed as a moving distance of the control point P.

Figure 6A:
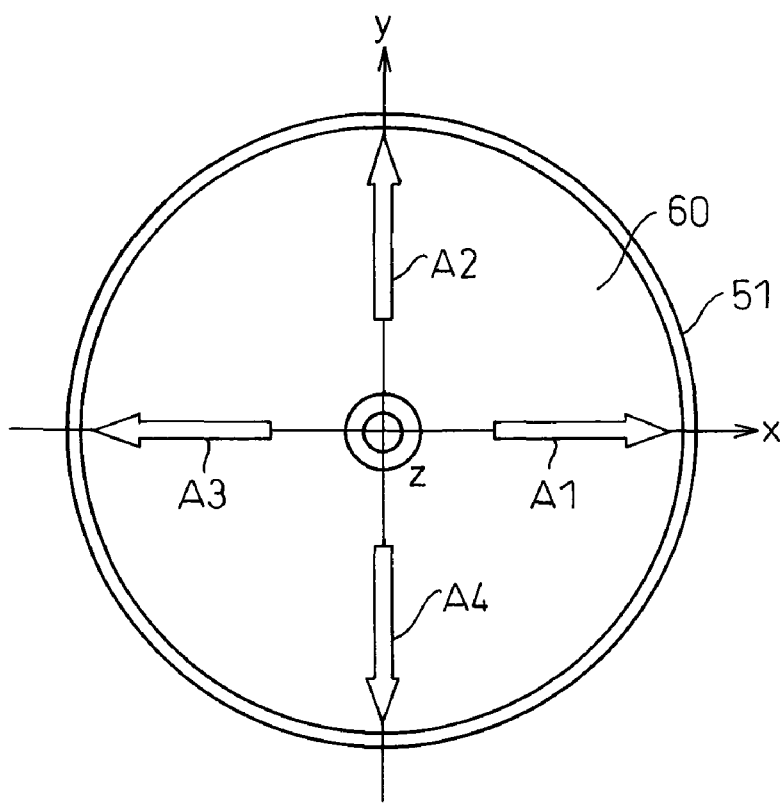
FIG. 6a is an end face view of a fitting workpiece.

Then, in steps 106 and 107 in FIG. 3, the fitting workpiece 60 is pressed against the workpiece 50 to be fitted in a direction perpendicular to the fitting direction. FIG. 6a is an end face view of the fitting workpiece 60. As shown by the arrow A1 in FIG. 6a, in the beginning, the fitting workpiece 60 is pressed against the workpiece 50 to be fitted, in the direction +X.

At this time, the fitting workpiece 60 is controlled according to the following expressions (16) to (20).

$$v^D_X = (F_X - F_d) \times G_X \quad (16)$$

$$v^D_Y = F_Y \times G_Y \quad (17)$$

$$v^D_Z = F_Z \times G_Z \quad (18)$$

$$\omega^D_X = M_X \times G_W \quad (19)$$

$$\omega^D_Y = M_Y \times G_P \quad (20)$$

Figure 7A:
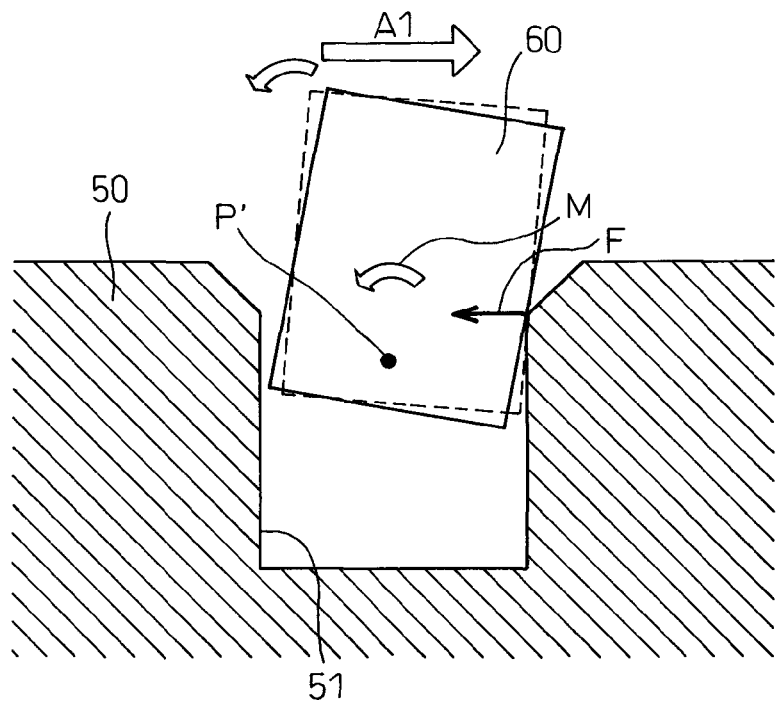
FIG. 7a is an enlarged sectional view showing a fitting workpiece and a workpiece to be fitted at the time of adjusting posture.
Figure 7B:
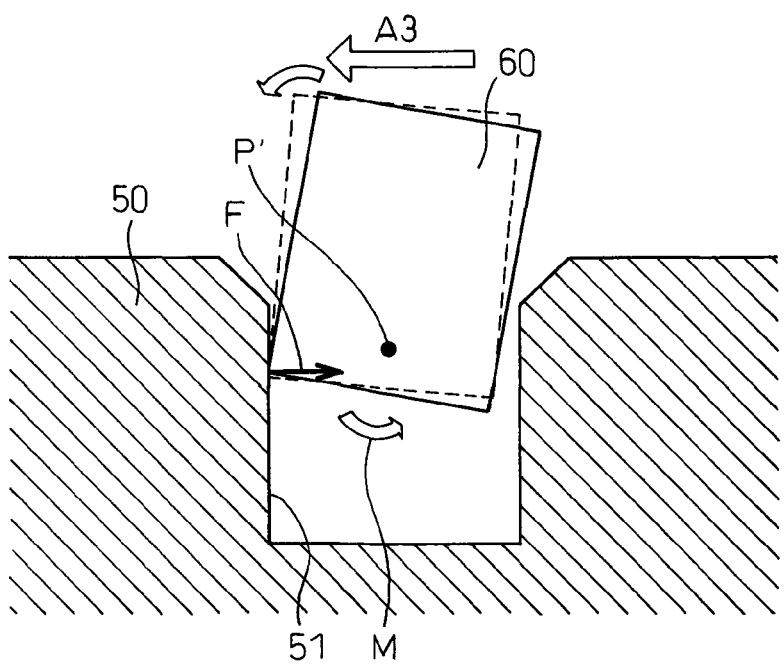
FIG. 7b is another enlarged sectional view showing a fitting workpiece and a workpiece to be fitted at the time of adjusting posture.

FIG. 7a is an enlarged sectional view showing a fitting workpiece and a workpiece to be fitted at the time of adjusting the posture. In the present invention, since a position of the control point P is moved upward to the control point P', the moment can easily act on the fitting workpiece 60 in this state. Accordingly, by the pressing action in the direction of +X, the force F shown in the drawing acts on the fitting workpiece 60 and the moment M round the control point P' acts on the fitting workpiece 60. Due to the foregoing, the fitting workpiece 60 is moved being rotated from the state shown by the solid line to the state shown by the broken line and an error of posture round the direction Y can be adjusted.

In other words, since the control point P is changed to the control point P' in the present invention, the moment can be positively acted on the fitting workpiece at the time of pressing action. Even in the case where intensities of the forces acting on two points of the fitting workpiece 60 are the same and directions are opposite to each other as explained in the prior art, the moment can be acted on the fitting workpiece and an error of posture of the fitting workpiece 60 can be adjusted in the present invention.

When all the following expressions are satisfied in step 108 shown in FIG. 3, a pressing action in the direction +X is finished.

$$|F_X - F_d| \leq T_F \quad (21)$$

$$|F_Y| \leq T_F \quad (22)$$

$$|F_Z| \leq T_F \quad (23)$$

$$|M_X| \leq T_M \quad (24)$$

$$|M_Y| \leq T_M \quad (25)$$

In the above expressions, the expression (21) expresses whether or not a force in the pressing direction (the direction +X) comes close to the target value. The expressions (22) to (25) express whether or not an error of position/posture of the fitting workpiece 60 is adjusted and the force/moment comes close to 0.

Figure 8A:
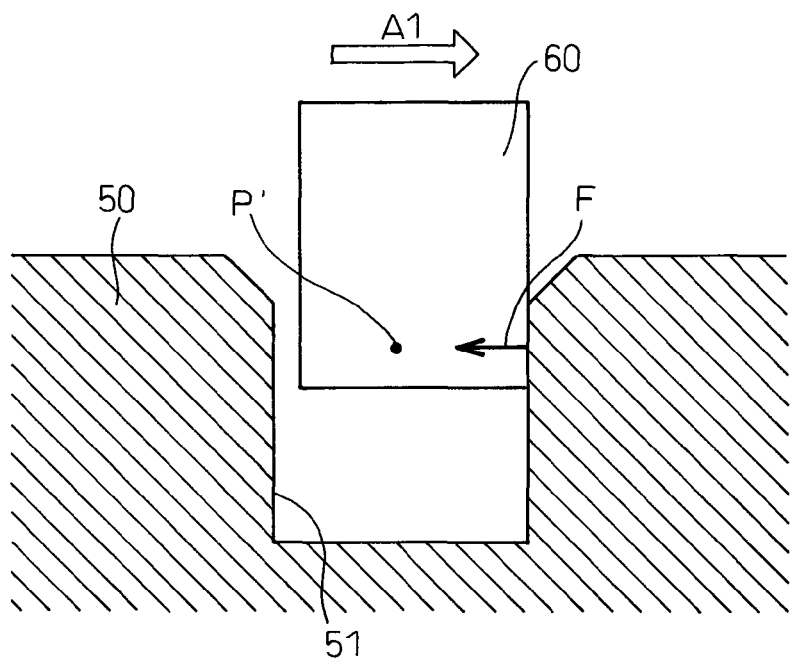
FIG. 8a is an enlarged sectional view showing a fitting workpiece and a workpiece to be fitted at the time of adjusting posture.
Figure 8B:
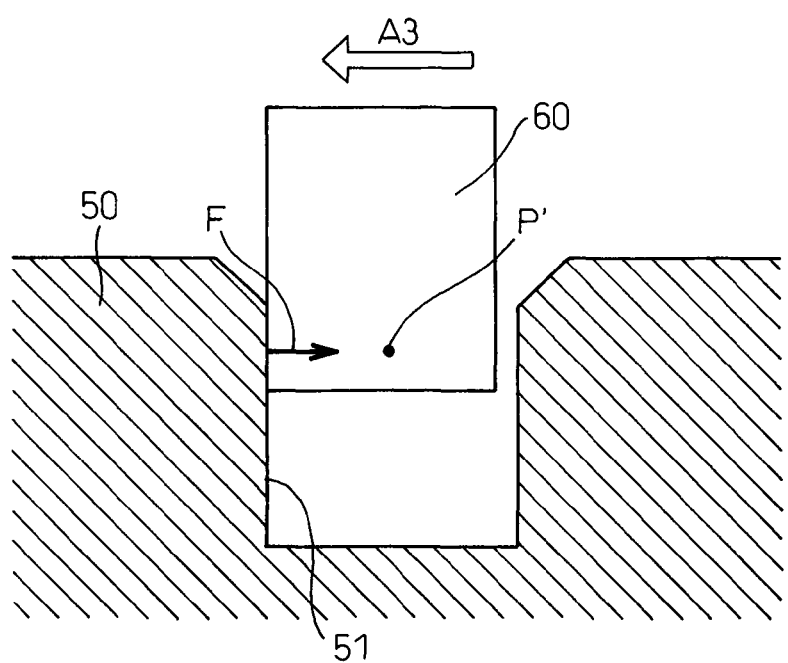
FIG. 8b is another enlarged sectional view showing a fitting workpiece and a workpiece to be fitted at the time of adjusting posture.

In this case, as shown in FIG. 7a and others, when a posture of the fitting workpiece 60 deviates, the moment M acts on the fitting workpiece 60. Therefore, the equation (24) or (25) is not satisfied. When a circumferential face of the fitting workpiece 60 comes into line contact with the fitting hole 51 of the workpiece 50 to be fitted as shown in FIG. 8a which is substantially the same as FIG. 7a, an error of posture of the fitting workpiece 60 is eliminated. In this case, no moment M acts on the fitting workpiece 60 and both the equations (24) and (25) are satisfied.

When the equations (21) to (25) are satisfied, it is judged that an adjustment of the error of posture round the direction Y of the fitting workpiece 60 has been completed. Then, when the fitting workpiece 60 is pressed in the direction +Y shown by the arrow A2 shown in FIG. 6a, an error of posture round the direction X of the fitting workpiece 60 is adjusted. Even in this case, the fitting workpiece 60 is controlled by the same expression as that described before and it is judged that a pressing action has been finished.

After that, the fitting workpiece 60 is pressed in the direction (the direction −X) shown by the arrow A3 in FIG. 6a in the same manner (refer to FIGS. 7a and 8a). Further, the fitting workpiece 60 is pressed in the direction (the direction −Y) shown by the arrow A4 in FIG. 6a in the same manner. Due to the foregoing, errors of posture in the directions X and Y of the fitting workpiece 60 are adjusted. In this connection, even in the case where an error of posture is caused round only either the direction X or the direction Y, no new error is caused by the pressing action.

In this connection, the order of the pressing actions on the arrows A1 to A4 may be appropriately changed or the number of pressing times in some pressing directions may be appropriately changed. Further, even in the case where the fitting workpiece 60 is pressed only in one of the directions of the arrows A1 and A3 and one of the directions of the arrows A2 and A4, it is possible to adjust an error of posture round the directions X and Y of the fitting workpiece 60.

After adjustments of errors of posture of the fitting workpiece 60 in all directions have been completed, the program returns to step 100. Then, the fitting workpiece 60 is further pressed in the fitting direction and processing is repeatedly executed until the fitting workpiece 60 is inserted into a position by a predetermined depth. In other words, each time the fitting workpiece 60 clogs again, the fitting workpiece 60 is pressed against the workpiece 50 to be fitted. Due to the foregoing, the fitting workpiece 60 can be appropriately fitted to the workpiece 50 to be fitted.

As described above, since the control point P is changed to the control point P' in the present invention, at the time of a pressing action, the moment positively acts on the fitting workpiece 60 and an error of posture of the fitting workpiece 60 can be adjusted. Further, by the reasons described above, an adjustment of the error of posture can be made in a short period of time. Further, even in the case where an allowable initial error of posture before fitting is relatively large, the fitting workpiece 60 can be fitted to the workpiece 50 to be fitted.

Figure 6B:
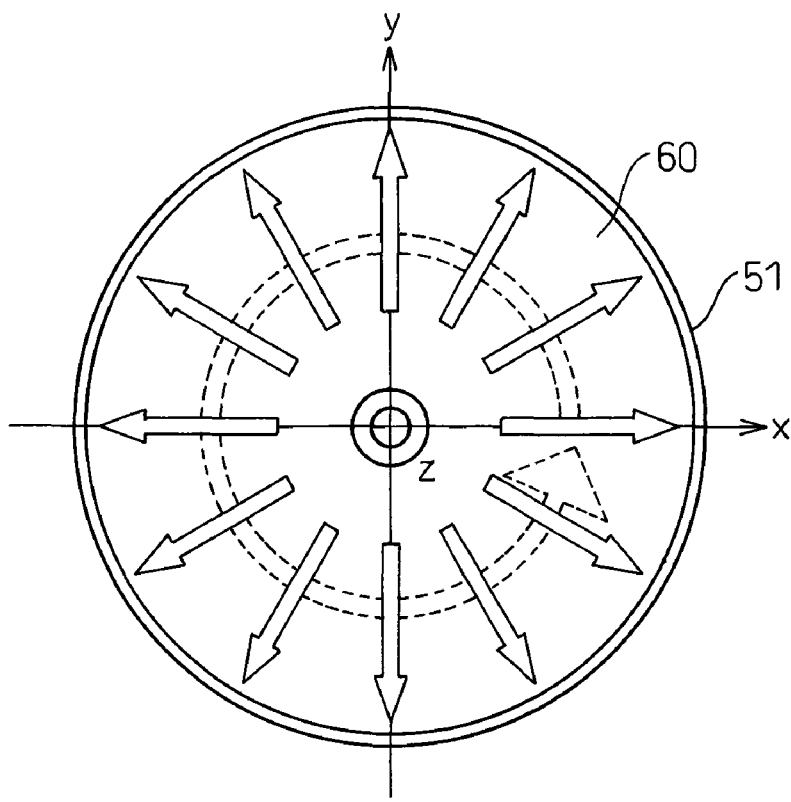
FIG. 6b is another end face view of a fitting workpiece.

In another embodiment shown in FIG. 6b and others, the pressing action may be executed in the circumferential direction of the fitting workpiece 60 in order. In this case, the fitting workpiece 60 is controlled according to the following expressions (26) to (31) and the pressing action of the fitting workpiece 60 is turned by one turn.

$$v^D{}_X = (F_X - F_d \cos\theta) \times G_X \tag{26}$$

$$v^D{}_Y = (F_Y - F_d \sin\theta) \times G_Y \tag{27}$$

$$v^D{}_Z = F_Z \times G_Z \tag{28}$$

$$\omega^D{}_X = M_X \times G_W \tag{29}$$

$$\omega^D{}_Y = M_Y \times G_P \tag{30}$$

$$\theta = \pi/10 \times t \tag{31}$$

In this connection, the character t in the expression (31) expresses the time that has passed from the start of changing the pressing direction. In other words, in these expressions, the pressing action of pressing the fitting workpiece 60 is executed in order along the circumferential face of the fitting workpiece 60 for 20 seconds. After this time has passed, the pressing action in the direction perpendicular to the fitting direction is finished.

In this connection, the expressions (26) to (30) express a case in which a pressing action is started in the direction +X and made in the circumferential direction in order. However, it is possible to start a pressing action in another direction. It is clear that the time of a pressing action executed in order along the circumferential face of the fitting workpiece 60 and the moving direction of the pressing action can be appropriately changed.

ADVANTAGES OF THE INVENTION

In the first invention, the control point is changed and the fitting workpiece is pressed in a direction perpendicular to the fitting direction. Due to the foregoing, the fitting workpiece is moved being rotated round a new control point. Accordingly, the posture of the fitting workpiece can be adjusted to be an appropriate posture for fitting. Since the control point is changed, even in the case where an error of posture at the initial stage before fitting is large, it is possible to adjust the error. In this connection, in the case where the control point is positioned at the center of the bottom face of the fitting workpiece, it is preferable that a position of the control point is changed in the direction of the fitting workpiece center line by a half of the entering distance of the fitting workpiece.

In the second invention, in the case where the detected moment is lower than a predetermined value, the fitting workpiece can not be rotated. Therefore, it can be judged that clogging has been caused. In other words, by a relatively simple method, the occurrence of clogging can be judged.

In the third invention, in the case where a change in the time detected for each period is smaller than a predetermined value, the fitting workpiece is not moved. Therefore, it can be judged that clogging has been caused. In other words, by a relatively simple method, the occurrence of clogging can be judged.

In the fourth invention, it is possible to adjust an error of posture of the fitting workpiece round the direction perpendicular to the pressing direction of the fitting workpiece. In this connection, an error of posture may be further adjusted when the fitting workpiece is also pressed in a direction opposite to the pressing direction of the fitting workpiece. Further, it is preferable that the fitting workpiece is further pressed in the direction perpendicular to both the fitting workpiece pressing direction and the fitting workpiece fitting direction.

In the fifth invention, a pressing action of the fitting workpiece is rotated. Therefore it is possible to easily adjust errors of posture in all directions.

Although the invention has been shown and described with exemplary embodiments thereof, it should be understood by those skilled in the art that the foregoing and various other changes, omissions and additions may be made therein and thereto without departing from the spirit and the scope of the invention.

The invention claimed is:

1. A fitting device for fitting a columnar type fitting workpiece, which is held by a robot, to a fitting hole, capable of being fitted to the fitting workpiece, of a workpiece to be fitted by force control, comprising:
    a force detecting portion for detecting a force and moment acting on a control point at a center of a bottom face of the fitting workpiece;
    a judging portion for judging whether or not clogging is caused between the fitting workpiece and the workpiece to be fitted at the time of fitting; and
    a changing portion for changing a position of the control point upward along a center line of the fitting workpiece by a value smaller than a distance by which the fitting workpiece enters into the fitting hole of the workpiece to be fitted and for pressing an outer circumferential face of the fitting workpiece against an inner circumferential face of the fitting hole of the workpiece to be fitted in a direction perpendicular to the fitting direction so as to adjust a posture of the fitting workpiece by the force control based on a moment acting around the control point that has been changed, in the case where it is judged by the judging portion that clogging is caused.

2. The fitting device according to claim 1, wherein the judging portion judges according to the force and moment detected by the force detecting portion whether or not clogging is caused.

3. The fitting device according to claim 1 further comprising a position detecting portion for detecting a position of the fitting workpiece for each predetermined period, wherein the judging portion judges according to a change in the time in the fitting direction of the fitting workpiece detected by the position detecting portion whether or not clogging is caused.

4. The fitting device according to claim 1, wherein the changing portion presses the fitting workpiece in at least one direction perpendicular to the fitting direction in the case where the judging portion judges that clogging is caused.

5. The fitting device according to claim 1, wherein the changing portion executes a pressing action in order in a direction perpendicular to the fitting direction of the fitting workpiece in a circumferential direction of the fitting workpiece in the case where the judging portion judges that clogging is caused.

* * * * *